United States Patent Office 3,024,281
Patented Mar. 6, 1962

3,024,281
AMIDOMETHYLATION OF AROMATIC HYDROCARBONS
Chester L. Parris, Pittsburgh, Pa., assignor to Pittsburgh Plate Glass Company, a corporation of Pennsylvania
No Drawing. Filed Jan. 7, 1960, Ser. No. 925
12 Claims. (Cl. 260—562)

This invention relates to a novel method for the preparation of N-aralkyl amides, and to the novel products obtained thereby, and it has particular relation to the preparation of such amides by the reaction of an aromatic hydrocarbon, formaldehyde (or other agent reacting to supply a methylene group in situ), and a nitrile.

In a copending application, Serial No. 693,031, filed October 29, 1957, it is disclosed that nitriles will react with a primary alcohol if the latter embodies a structure of the formula:

$$Ar\!-\!(CH_2OH)_n$$

wherein Ar is an aromatic radical having at least one substituent selected from the class consisting of alkyl groups and alkoxy groups in ortho or para relationship to a —CH$_2$OH group, and $n$ is a whole number from 1 to 5, and preferably 1 to 3.

The resultant amide obtained by reaction of such primary alcohol and a nitrile is of the structure:

$$Ar\!-\!(CH_2\!-\!N\!-\!C\!-\!R)_n$$
$$\quad\quad\;\; H\;\;\; \|$$
$$\quad\quad\quad\quad\; O$$

wherein R is hydrogen or an organic radical, preferably an alkyl or aryl radical, and Ar and $n$ have the significance previously set forth.

This invention is based upon the discovery that amides of the type disclosed in the aforementioned copending application can readily be prepared by reacting (A) an aromatic hydrocarbon or an alkyl, alkoxy or halo-substituted aromatic hydrocarbon containing at least one available hydrogen atom in the aromatic nucleus, (B) a nitrile, and (C) formaldehyde or a formaldehyde-supplying agent such as paraformaldehyde, trioxane, trioxymethylene, or the like.

The reaction described in the foregoing paragraph is believed to proceed substantially according to the following equation, wherein formaldehyde is utilized for illustrative purposes:

$$Ar_1 + CH_2O \times RCN \xrightarrow[\text{Catalyst}]{\text{Acidic}} Ar_2\!-\!(CH_2\!-\!N\!-\!C\!-\!R)_n$$
$$\quad\quad\quad\quad\quad\quad\quad\quad\quad\quad\quad\quad H\;\;\; \|$$
$$\quad\quad\quad\quad\quad\quad\quad\quad\quad\quad\quad\quad\quad\; O$$

wherein $Ar_1$ is an aromatic compound, preferably one having one or more alkyl, alkoxy, or halogen substituents, $Ar_2$ is an aromatic radical derived by removing nuclear hydrogen atoms from the compound $Ar_1$, and is preferably an aromatic hydrocarbon radical, and R and $n$ have the significance set forth above.

It is very surprising that the reaction of an aromatic hydrocarbon with a nitrile and a methylating agent would proceed in this manner to produce substantial yields of amides of the structure shown in the equation, since it would be predicted that several possible competing reactions would take place preferentially. One of these involves the reaction of the nitrile with formaldehyde to form methylene bisamides and a second the reaction of the methylating agent with hydrocarbons to form methylol substituted aromatic compounds, followed by self-condensation of these methylol groups to form polymeric materials.

Aromatic compounds or nuclear substituted aromatic compounds of the structure $Ar_1$, which may be employed in conducting the reaction in accordance with the provisions of the present invention embody a relatively broad class. For example, they include aromatic hydrocarbons such as benzene, naphthalene and anthracene, that is, aromatic hydrocarbons containing from 1 to 3 benzene nuclei. Also included are the aromatic compounds wherein the ring structure is substituted with alkyl groups, alkoxy groups, or halogen atoms. For example, the aromatic compound may have such alkyl substituents as methyl, ethyl, propyl, butyl, amyl, hexyl, heptyl, octyl, decyl; alkoxy substituents such as methoxy, ethoxy, propoxy, butoxy, pentoxy, hexoxy, and the like; or halogen substituents such as chlorine, bromine, fluorine or iodine. The number of any such substituents on the aromatic nuclei is not critical, although it is necessary that there be at least one nuclear hydrogen atom in the compound of the structure $Ar_1$. When substituents such as those described above are present, it is preferred that they be lower alkyl or lower alkoxy, chlorine, or bromine. Among the specific compounds of the structure $Ar_1$ which may be used with best results are included benzene, naphthalene, anthracene, toluene, xylene (o-, m-, or p-), ethylbenzene, cumene, durene, isodurene, mesitylene, anisole, chlorobenzene, bromobenzene, chlorotoluene, and the like.

Nitriles which may be employed in the reaction possess the formula RCN. R may represent hydrogen or a wide variety of organic radicals including the following:

Alkyl groups such as methyl, ethyl, propyl, butyl, amyl, hexyl, heptyl, octyl, decyl, dodecyl, and the like alkyl groups containing up to 18 carbon atoms or more;

Hydroxyalkyl groups such as hydroxymethyl, hydroxyethyl, hydroxypropyl, hydroxybutyl, hydroxyamyl, hydroxyoctyl, and the like groups containing up to 18 or more carbon atoms;

Haloalkyl groups such as chloromethyl, chloroethyl, chloropropyl, chlorobutyl, chlorooctyl, bromomethyl, bromoethyl, bromopropyl, bromobutyl, bromostearyl, and the corresponding iodo and fluoroalkyl groups containing up to 18 or more carbon atoms;

Carbalkoxyalkyl groups such as carbethoxymethyl, carbethoxyethyl, carbethoxypropyl, carbethoxybutyl, carbethoxyoctyl, carbmethoxymethyl, carbmethoxybutyl, carbmethoxynonyl, carbbutoxymethyl, carbbutoxypropyl, carbbutoxyheptyl, and the like carbalkoxyalkyl groups containing up to 18 or more carbon atoms;

Aryl groups such as phenyl, naphthyl, anthracyl, diphenyl, and the like aryl groups containing from 1 to 3 benzene nuclei;

Aralkyl groups such as benzyl, phenylethyl, phenylpropyl, phenylbutyl, phenyloctyl, naphthyloctyl, anthracylbutyl, anthracyloctyl, and the like; and Ethylenically unsaturated hydrocarbon radicals such as vinyl, allyl, methallyl, butenyl, pentenyl, hexenyl, octenyl, and the like containing up to about 12 or more carbon atoms.

The preferred compounds of structure RCN for use in the reaction of the present invention are those in which R represents a lower alkyl radical, a lower ethylenically unsaturated hydrocarbon radical, a phenyl radical, or an aralkyl radical.

The reaction between the aromatic compound, the formaldehyde, and the nitrile, as already indicated, is conducted in the presence of a catalyst. The catalysts which are employed are the mineral acids such as phosphoric acid, polyphosphoric acid, sulfuric acid, hydrochloric acid, nitric acid, and the like. In many instances, it is desirable to use some organic acid in conjunction with the mineral acid. Organic acids which may be employed include acetic acid, propionic acid, butyric acid, and the like. Apparently the organic acid serves as a diluent for the mineral acid. When an organic acid is utilized it is generally employed in an amount of 25 percent to 80 percent by weight of the catalyst mixture.

The mineral acid catalyst is usually employed in a ratio of about 20 percent to 80 percent by weight based upon the weight of the total reactant mixture exclusive of solvent. However, the amount of acid utilized is not limited to any particular molar ratio since the acid, in some instances, serves both as a catalyst and diluent for the reaction. It may be employed, for example, in the range of about 5 percent to 500 percent by weight of the reactants shown above. Generally the mixture is anhydrous, or at least the water content should be as low as is practical, for example, below about 20 percent by weight of the catalyst mixture, in order to control unwanted side reactions.

In conducting the reaction, it is usually preferred to incorporate the methylene supplying agent (e.g., formaldehyde) slowly into the nitrile, in the presence of the acid, followed by incorporation of the aromatic compound. However, this order of procedure is not in all instances strictly necessary, since very good results may often be obtained by adding all components concurrently, or by adding the nitrile and the aromatic compound first and finally adding the methylene supplying agent. The methylene supplying agent, e.g., paraformaldehyde, and the nitrile may be mixed and then incorporated with the catalyst. When the methylene supplying agent and the nitrile are incorporated into the acid first, chemical reaction may occur to provide one or more intermediates which then react with the aromatic compound to provide amidomethyl side chains upon the aromatic ring of the hydrocarbon.

The relative proportions of the reactants may be varied widely, depending primarily upon the particular compound it is desired to prepare. For example, if m-xylene is employed as the aromatic compound and it is desired to obtain a diamide therefrom, the molar ratio of nitrile to the methylene supplying compound to the aromatic compound should be approximately 2:2:1. If it is desired to obtain predominantly a monoamide from m-xylene, or other aromatic compound, approximately 1 mole of the nitrile, 1 mole of the methylene supplying agent and about 1 to 50 moles of the aromatic compound should be employed, since excesses of the aromatic compound tend strongly to result in the formation predominantly of the monoamide. Obviously, where the functionality of the product is not important, the above ratios can be varied within wide limits, although it is disadvantageous from an economic standpoint to employ extremely large excesses of any of the reactants.

The temperature of reaction may vary over a relatively broad range, for example, from about 0° C. to about 130° C., depending upon the speed with which it is desired to effect the reaction. At lower temperatures, the reaction proceeds slowly and may require as long as several days to reach a satisfactory degree of completion.

In some instances, when the reaction is started, the temperature rises exothermically and the application of heat, at least during the early stages is not required. However, the desired temperature range may be maintained either by application of external heat or by cooling, as particular conditions may require. Usually, the reaction is completed in a period of about 30 minutes to 60 hours depending upon the temperature at which the reaction is conducted.

As a result of the reaction, "salts" of the amides and the acid catalyst are usually formed. These salts are readily broken down by hydrolysis, even in washing or by otherwise treating the reaction products with water at room temperature, or near room temperature. The acids may thus be washed from the product to provide the free amide products.

It is also practical to heat the mixture of reaction products comprising the salts of amides with additional water and acid, whereby to form the free amine salts. In a subsequent portion of this specification, it is also described to recover the amide product, then to add aqueous acid and to heat the mixture to provide the free amine or the salt thereof. The salts may be treated with alkali to liberate the free amine. The free amine may also be recovered from the amide by alkaline hydrolysis effected in a pressure reactor.

Assuming that the amides are to be recovered as such at the conclusion of the reaction, the product may be purified by washing out any water soluble component, including any excess of catalyst, by application of aqueous ammonia. The washed product may be further purified by appropriate techniques, e.g., crystallization, vacuum distillation, etc.

The amides prepared by the foregoing method are useful for various purposes. For example, they may be hydrolyzed as previously indicated by heating with water and in the presence of strong mineral acids such as sulfuric acid to form the corresponding amine salts which can be neutralized to liberate the amines. The diamines are useful for various purposes, as for example, in the reaction with dicarboxylic acids such as sebacic acid or adipic acid to form thermoplastic polyamide resins. Such resins may be spun into filaments such as are used in fabrics and in cordage. Some of the amides containing

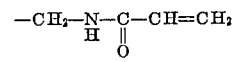

groups can be homopolymerized by addition reactions. Likewise, the corresponding amines may be employed as catalysts or hardening agents in place of conventional amines in curing epoxy resins.

The amines such as the diamines may be reacted with hydrochloric acid to form amine salts, which in turn, can betreated with phosgene to form the corresponding isocyanates. This reaction is especially suitable for treating diamines to form diisocyanates, such as di-(isocyanatomethyl)-m-xylenes. These diisocyanates may be reacted with polyols and especially polyols of the aliphatic series, such as castor oil or mixture thereof with polyethylene glycol to form resins. They may also be reacted with polyesters containing unreacted hydroxyl groups in an amount to provide hydroxyl values from about 40 to 600. Such polyesters are represented by those of dicarboxylic acids such as adipic acid or phthalic acid with polyhydric alcohols such as ethylene glycol, diethylene glycol, bis(hydroxymethyl)-m-xylene and others, or mixtures of such dihydric alcohols with polyhydric alcohols or other alcohols containing more than two hydroxyl groups and being represented by glycerol, pentaerythritol, or the like. The products of reaction of the diisocyanate compounds and the polyhydric alcohols are thermosetting resins known as polyurethane resins. These, if prepared in the absence of water, may be used for coating surfaces of metal, wood, concrete, stone or the like materials to provide decorative and/or protective finishes upon substrates of the foregoing materials. Water may also be included in the diisocyanate-polyol mixture to induce formation of carbon dioxide, thus causing the mixture to form before it sets. Cushioning materials and insulative materials may be so formed.

An advantage of diisocyanates prepared in this manner resides in the fact that they possess but little odor as compared with conventional diisocyanates. Films from these diisocyanates and polyesters cure quite rapidly and are free from "crawl" effects.

The techniques of the present invention and the products produced thereby are illustrative by the following examples:

*Example I*

In this example, 4,6-bis(acrylamidomethyl)-m-xylene was prepared by the reaction of m-xylene, acrylonitrile as the nitrile component, and paraformaldehyde as the agent providing the methylene group.

The reaction mixture comprised:

| | Grams |
|---|---|
| Paraformaldehyde | 360 |
| m-Xylene | 530 |
| Acrylonitrile | 560 |

The mixture was catalyzed with 1500 milliliters of 85 percent phosphoric acid, in a 5-liter, round-bottom flask provided with a condenser, a thermometer and means for regulating the temperature. The reaction was initiated by stirring and concommitantly heating the mixture to a temperature within a range of 65° C. to 70° C. The reaction proceeded exothermically and a reaction temperature within a range of 70° C. to 75° C. was maintained by cooling the mixture. At the end of the exothermic stage, the temperature was raised to 90° C. for a period of 4 to 5 hours.

The reaction mixture was then cooled and allowed to stand for 16 hours. The resultant viscous yellow product was introduced into a dropping funnel and was allowed to run slowly into a large volume (e.g., 6 to 8 liters) of vigorously agitated cold water. The voluminous white solid which was precipitated was washed in dilute aqueous ammonia and then was filtered and dried for about 36 hours at 70° C. The yield was 75 percent.

The product homopolymerized when heated to a temperature above about 200° C. to provide a resin. When the material of this example was mixed with a corresponding material obtained by the reaction of bis(hydroxymethyl)-m-xylene and acrylonitrile and the mixture was heated to polymerization temperature, the same polymerization occurs, indicating that the material of this example was identical with that obtained by the reaction of corresponding diol and acrylonitrile.

In this example, it will be apparent that the m-xylene may be replaced by molecularly equivalent amounts of other aromatic compounds such as p-xylene, durene, benzene, toluene, anthracene, mesitylene, 1-methyl naphthalene, and the like. Likewise, the acrylonitrile may be replaced by acetonitrile, benzonitrile, propionitrile, adiponitrile, succinonitrile, and others.

*Example II*

In accordance with this example, 4,6-bis(acetamidomethyl)-m-xylene was prepared by the reaction of m-xylene as the hydrocarbon, acetonitrile as the nitrile, and paraformaldehyde as the methylene supplying agent. Phosphoric acid (85 percent) was employed as the catalyst.

The reaction mixture comprised:

| | | |
|---|---|---|
| Phosphoric acid (85 percent) | milliliters | 1,500 |
| Paraformaldehyde | grams | 360 |
| m-Xylene | do | 530 |
| Acetonitrile | do | 535 |

The mixture was introduced into a flask as in Example I and was heated to 65° C. with vigorous agitation. The reaction mixture was maintained at a temperature of 70° C. to 75° C. during the exothermal stage and was then held at 90° C. to 92° C. for 4 hours and then allowed to cool to room temperature.

The mixture, when cooled, consisted of an upper layer of 124 grams to 136 grams of unreacted xylene. The lower viscous layer was added slowly with vigorous agitation to 8 liters of cold water containing 2 to 3 liters of ammonium hydroxide. The resultant suspension was stirred overnight and the slurry was filtered, washed with dilute ammonia water and was then dried at 75° C. for 24 hours. The yield was about 600 grams of crude 4,6-bis(acetamidomethyl)-m-xylene having a melting point of 225° C. to 235° C. The material after recrystallization from methanol had a melting point of 257° C. to 259° C. The melting point was not changed when the material was mixed with a material obtained by the reaction of 4,6-bis(hydroxymethyl)-m-xylene and acetonitrile. The material may be employed as an intermediate in forming amines and isocyanates.

*Example III*

This example illustrates the preparation of the disulfate "salt" or complex of 4,6-bis(acetamidomethyl)-m-xylene, then the free diamide itself. The reaction mixture comprised:

| | | |
|---|---|---|
| Sulfuric acid | milliliters | 150 |
| Glacial acetic acid | do | 1,750 |
| Paraformaldehyde | grams | 72 |
| Acetonitrile | do | 107 |
| m-Xylene | do | 106 |

The paraformaldehyde was added to the cooled mixture of acetic and sulfuric acids, and the acetonitrile was added dropwise while the temperature was maintained between 30° C. and 70° C. The xylene was added and the mixture heated at 90° C. for 6 hours, then cooled to room temperature. The resulting voluminous white solid was filtered and washed with a little fresh acetic acid, and then with ether. After drying in vacuum it was found to have the following analysis:

| | Percent |
|---|---|
| Nitrogen | 6.70 |
| Sulfur | 14.60 |
| Sulfuric acid | 43.61 |

The theoretical composition is:

| | Percent |
|---|---|
| Nitrogen | 6.30 |
| Sulfur | 14.41 |
| Sulfuric acid | 44.19 |

A portion of this solid was suspended in water and dilute sodium hydroxide added slowly until the pH of the suspension was almost 8. During this operation, the mixture became warm. The white solid was then filtered and washed copiously with water. After drying at 110° C., the product had a melting point of 245° C.–255° C. After one recrystallization from methanol, the melting point was 251° C.–255 C. and was identical with the product obtained in Example II.

*Example IV*

This example illustrates the preparation of 2,5-bis-(acetamidomethyl)-p-xylene. The catalyst or promoter of reaction comprised a mixture of 50 milliliters of sulfuric acid (concentrated) in 100 milliliters of acetic acid. The reaction mixture comprised:

| | | |
|---|---|---|
| Catalyst mixture | milliliters | 150 |
| Paraformaldehyde | grams | 16 |
| p-Xylene | do | 53 |
| Acetonitrile | do | 53.5 |

The paraformaldehyde was added to the cold catalyst mixture and a mixture of the p-xylene and the acetonitrile was added dropwise at a temperature below 72° C. After the exothermic reaction was spent, the temperature was raised to 90° C. As the mixture was heated, it became viscous and opaque, and after 3 hours, it partially solidified. The product was poured into 8 to 10 liters of water and a suspension was formed. Dilute ammonia was added to the suspension and the mixture was agitated. The solid disintegrated and the resultant granular product was filtered and washed with hot water and was dried at about 70° C. A yield of 75 grams of a solid melting at 240° C.–248° C. was obtained. The product was recrystallized from alcohol to provide a purified material which melts at 275° C. This product was 2,5-bis(acetamidomethyl)-p-xylene of the formula:

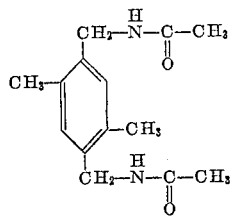

The theoretical nitrogen content of this compound is 11.28 percent. The analytically determined value was 11.15 percent.

This compound can be converted to the corresponding diamine and then to the corresponding diisocyanate. These have the fields of application already described.

*Example V*

This example illustrates the preparation of bis(acetamidomethyl)-naphthalene of the formula:

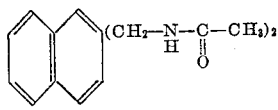

The reaction mixture comprised:

| | | |
|---|---|---|
| Paraformaldehyde | grams | 36 |
| Naphthalene | do | 64 |
| Acetonitrile | do | 53.5 |
| Sulfuric acid-acetic acid mixture | milliliters | 150 |

The paraformaldehyde was added to the cold catalyst mixture. The acetonitrile was then added dropwise. During the addition of the acetonitrile, the temperature rose to about 60° C. to 70° C. After the addition of the acetonitrile was complete, the naphthalene was added and the temperature maintained at 90° C. to 100° C. until a clear, viscous orange color was developed. After 4 hours the mixture was poured into dilute ammonia whereupon a tacky solid was precipitated. The solid crystallized slowly upon standing. After two recrystallizations from methanol, the melting point was within a range of 277° C. to 278° C. The product was the desired bis(acetamidomethyl)-naphthalene. The theoretical nitrogen content of this compound is 10.37 percent. The value found by analysis was 10.56 percent.

*Example VI*

The product as obtained by the method of this example was 4,6-bis(acetamidomethyl)-m-xylene. In conducting the reaction a catalyst mixture was employed comprising 450 milliliters of sulfuric acid in 1050 milliliters of acetic acid. To this mixture was added 360 grams of paraformaldehyde. The suspension was stirred and 535 grams (13 moles) of acetonitrile added dropwise. The temperature was allowed to rise to 60° C. and was held at 55° C.–60° C. until the addition was complete. During this time, the mixture turned viscous and ultimately opaque. After about one hour of additional heating at 70° C., all the paraformaldehyde was consumed and a clear, light yellow homogeneous liquid resulted.

At this point, 530 grams (5 moles) of m-xylene was added and the mixture heated at 90° C.–95° C. for 4 hours. During this time, the opaque color turned and after standing for 3 days, the mixture was completely solidified. The soft cake obtained was taken up in dilute ammonia, washed, filtered and dried to give 980 grams (a 78 percent yield) of 4,6-bis-(acetamidomethyl)-m-xylene melting at 228° C. This product when recrystallized from methanol had a melting point of 255° C. to 257° C. and was relatively pure.

*Example VII*

In accordance with this example, the techniques of Example VI were repeated but with a commercial mixture of xylene as the hydrocarbon component. The resultant product was obtained in good yield.

*Example VIII*

The product of this example was acetamidomethyl-o-xylene of the formula:

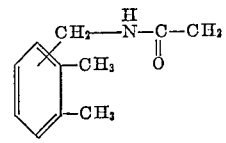

In conducting the reaction, a mixture was prepared comprising 45 milliliters of sulfuric acid in 105 milliliters of glacial acetic acid. To the cold mixture were added 18 grams (0.6 mole) of paraformaldehyde and 27.6 grams acetonitrile. The addition was effected dropwise while the spontaneous reaction was allowed to carry the temperature to 55° C. After the addition was complete, the mixture was maintained at 70° C. for 2 hours to provide a clear yellow solution.

Fifty-three grams (0.5 mole) of o-xylene was added slowly to initiate a spontaneous reaction which caused the temperature to rise to 75° C. Finally, the clear dark yellow solution was heated at 90° C. to 100° C. for 3 hours and the mixture was then cooled overnight. The mixture was poured into dilute ammonia and extracted with ether. After washing with water and drying the mixture over calcium chloride, the solvent and the residue were distilled in vacuum.

There was obtained a colorless oil which crystallized on cooling. This crystalline product was obtained in a yield of 54 percent.

After recrystallization from a mixture of benzene and petroleum ether, the melting point was 87° C.–89° C.

The theoretical analysis is:

| | Percent |
|---|---|
| Carbon | 74.9 |
| Hydrogen | 8.5 |

The actual analysis was:

| | Percent |
|---|---|
| Carbon | 75.3 |
| Hydrogen | 8.4 |

*Example IX*

In this example, trioxymethylene, acrylonitrile and toluene were reacted to form a mixture of acrylamidomethyl toluenes of the formula

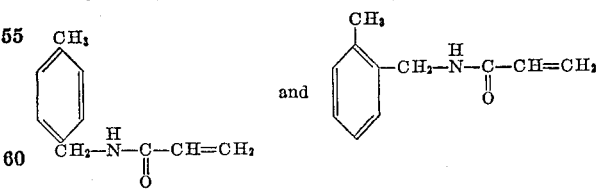

In the reaction, the catalyst comprised 50 milliliters of sulfuric acid in 100 milliliters of glacial acetic acid. The catalyst mixture was cooled and 18 grams (0.6 mole) of trioxymethylene was added. To the resultant mixture was added dropwise a mixture of 46 grams (0.5 mole) of toluene and 34.5 grams (0.65 mole) of acrylonitrile, while the temperature was maintained below 28° C. After the addition was complete, spontaneous reaction continued, and the mixture was held at 25° C. to 28° C. for 7½ hours.

The mixture was then poured into 1.5 liters of dilute ammonium hydroxide with vigorous agitation. An oil was precipitated which soon solidified. The suspension was stirred overnight, then filtered, washed free of acid and air dried. The mixture was recrystallized from a mixture of benzene and hexane. The crystalline product, acrylamidomethyl toluene, had a melting point of 108° C. to 110° C. The calculated nitrogen content based upon the foregoing formula is 8.02. The analytically determined nitrogen content was 8.22.

*Example X*

The product of this example was a mixture of ortho- and para-acetamidomethyl toluene. The reaction again was catalyzed with concentrated sulfuric acid in glacial acetic acid. The reaction mixture comprised:

| | | |
|---|---|---|
| Sulfuric acid | milliliters | 500 |
| Glacial acetic acid | do | 1,000 |
| Paraformaldehyde | grams | 360 |
| Acetonitrile | do | 535 |
| Toluene | do | 460 |

The paraformaldehyde was dissolved in the promoter mixture and the toluene and acetonitrile as a mixture was added dropwise. The temperature rose spontaneously to 70° C. and was held in a range of 65° C. to 70° C. until the addition was complete and the spontaneous reaction was finished. Subsequently the temperature was maintained at 90° C. to 95° C. for 3 hours.

The reaction mixture was then poured, with vigorous agitation, into 10 liters of dilute ammonia. The resulting oil was extracted with ether, washed with water and distilled to remove residual solvent. The residual yellow oil obtained was taken up in a mixture of benzene and hexane and chilled. The resulting white solid was filtered, the filtrate being retained for further processing.

The solid was recrystallized from benzene to provide a product melting at 114° C. to 115° C. The theoretical nitrogen content of the product is 8.60 percent whereas that experimentally determined was 8.72 percent. The product was p-(acetamidomethyl)-toluene.

The filtrate indicated above was distilled to remove solvent and the residue distilled in vacuum to yield a colorless oil boiling in a range of 132° C. to 135° C. at a pressure of 0.05 millimeter of mercury (absolute). The colorless oil crystallized and after recrystallization from hexane, a product was obtained having a melting point of 44° C. to 68° C. This product consisted essentially of o-(acetamidomethyl)-toluene.

*Example XI*

The product of this example is N-benzylacetamide. The reaction mixture comprised:

| | | |
|---|---|---|
| Sulfuric acid | milliliters | 45 |
| Glacial acetic acid | do | 105 |
| Trioxymethylene | grams | 18 |
| Acetonitrile | do | 26.7 |
| Benzene | do | 39 |

The trioxymethylene was added to the cooled mixture of the acids and the acetonitrile was added dropwise. The temperature was allowed to rise spontaneously to 55° C. and then to 70° C. to 75° C. until the reaction was completed. The benzene was then added and the mixture refluxed for 18 hours, during which time the temperature rose to 113° C.

The reaction product was poured into water and extracted with a mixture of ether and butanol. The extract was separated from the aqueous phase, washed with water and distilled to remove the solvents. The residual oil was distilled and there was obtained 37.2 grams of oil of a boiling point of 125° C.–135° C. at 0.05 milliliter of mercury (absolute). Upon cooling, the oil set to a white solid. After two recrystallizations from a mixture of benzene and petroleum ether, the melting point was 62° C.–63.5° C. The theoretical nitrogen content is 9.39 percent. The nitrogen content found by analysis was 9.43 percent.

*Example XII*

The product described in this example is 3,6-bis-(acetamidomethyl)-durene of the following formula:

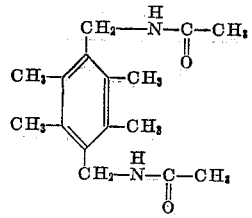

The reaction mixture comprised:

| | | |
|---|---|---|
| Glacial acetic acid | milliliters | 1,750 |
| Sulfuric acid | do | 150 |
| Acetonitrile | grams | 107 |
| Paraformaldehyde | do | 72 |
| Durene | do | 134 |

The paraformaldehyde was added to a cooled mixture of acids and acetonitrile was added dropwise below 70° C. The powdered durene was added and the mixture heated at 90° C. for 5 hours. After cooling, the resulting white precipitate was filtered and washed with a little fresh acetic acid and petroleum ether. The solid was then washed repeatedly with water until the water washings were neutral. After drying there was obtained 198 grams of white product melting at 315° C. After three recrystallizations from glacial acetic acid, the analysis of the compound was as follows:

| | Percent |
|---|---|
| Carbon | 69.53; 69.36 |
| Hydrogen | 8.50; 8.58 |
| Nitrogen | 10.14 |

The theoretical analysis of the compound is:

| | Percent |
|---|---|
| Carbon | 69.53 |
| Hydrogen | 8.75 |
| Nitrogen | 10.25 |

*Example XIII*

The product in this example is N-(2,4-dimethylbenzyl)-acetamide of the following formula:

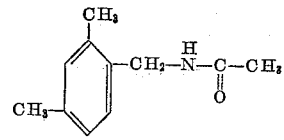

The reaction mixture comprised:

| | | |
|---|---|---|
| Sulfuric acid | milliliters | 225 |
| Glacial acetic acid | do | 1050 |
| Paraformaldehyde | grams | 75 |
| Acetonitrile | do | 112.5 |
| m-Xylene | do | 1590 |

The paraformaldehyde was added to a cooled mixture of the acids and acetonitrile was added dropwise while the temperature was maintained below 70° C. The xylene was added and the mixture then heated for 4.5 hours at a temperature of 85° C.–90° C. The cooled mixture consisted of two phases, the lower of which crystallized upon standing for 20 hours. The crystals were filtered and washed with water until the water washings were neutral. The resulting soft solid was distilled and had a boiling point of 190° C.–195° C. at 1 millimeter of mercury. The cooled distillate solidified and was further purified by recrystallization from a mixture of benzene and petroleum ether, after which the melting point was 115° C.–116° C. The theoretical analysis for this compound is:

| | Percent |
|---|---|
| Carbon | 74.54 |
| Hydrogen | 8.53 |
| Nitrogen | 7.90 |

The experimentally determined values were:

| | Percent |
|---|---|
| Carbon | 74.62; 74.45 |
| Hydrogen | 8.31; 8.59 |
| Nitrogen | 8.25 |

Example XIV

The product described in this example is N-(2,4-dimethylbenzyl)-formamide of the following formula:

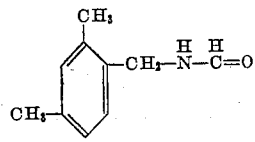

The reaction mixture consisted of:

| | | |
|---|---|---|
| Sulfuric acid | milliliters | 45 |
| Glacial acetic acid | do | 105 |
| Liquid hydrogen cyanide | grams | 35.1 |
| Paraformaldehyde | do | 36 |
| m-Xylene | do | 53 |

The acids were mixed and cooled and the paraformaldehyde added. The liquid hydrogen cyanide was added dropwise while the reaction mixture was maintained at a temperature of 30° C.–35° C. After the exothermic reaction was complete, the xylene was added and the temperature rose to 75° C.–80° C. After 3 hours the viscous mixture was cooled and poured into dilute ammonium hydroxide. An oil solid was precipitated which was recrystallized from methanol. The purified product melted at 120° C.–122° C. The theoretical nitrogen content for this compound is 8.8 percent. The content determined by analysis was 8.6 percent.

In place of the liquid hydrogen cyanide, one may employ an inorganic cyanide, such as sodium or calcium cyanide, together with an additional amount of sulfuric acid, in order to generate hydrogen cyanide in situ. The latter may then react to form N-(2,4-dimethylbenzyl)-formamides.

The compound disclosed in this example has also been prepared by heating 2,4-dimethylbenzyl amine with formic acid in the presence of an inert diluent. The resulting product has the same characteristics as described above.

Example XV

In order to prepare 4,6-bis(formamidomethyl)-m-xylene of the formula:

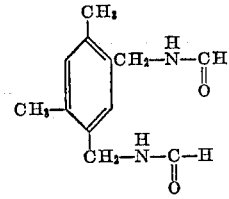

the reactants of Example XIV were introduced into a pressure vessel. This compound has been prepared previously by the invention of heating 4,6-bis-aminomethyl)-m-xylene with formic acid in the presence of an inert diluent.

The resulting product had a melting point of 222° C.–225° C. The theoretical nitrogen content is 12.72 percent. The experimentally determined value is 12.81 percent.

Example XVI

Twenty-four and six-tenths (24.6) grams of acetonitrile were added dropwise to a solution of 20 grams of 91 percent paraformaldehyde in 175 milliliters of concentrated sulfuric acid over a period of 45 minutes. Seventy-nine (79) grams of bromobenzene was then added to the reaction mixture, the temperature being controlled at 35° C. to 40° C. until the spontaneous reaction was completed, after which the mixture was heated at 80° C. to 85° C. for 4 hours. The reaction mixture was then poured into water, neutralized with ammonia and extracted with ethyl acetate. The solvent was stripped and the oily residue distilled at a temperature in the range of 109° C. to 110° C. (0.1–0.8 mm.). Forty-two grams (42 g.) of a yellow solid collected in the receiver. The distillate was suspended in hot water, extracted with benzene and the benzene extract concentrated to give 16 grams of a residue which solidified upon cooling, melting point 108° C.–111° C. The solid was recrystallized two times from a mixture of benzene and petroleum ether to give N-(4-bromobenzyl)-acetamide melting at 118.5° C.–120° C.

*Analysis.*—Calculated for $C_9H_{10}BrNO$:

| | Percent |
|---|---|
| Carbon | 47.39 |
| Hydrogen | 4.42 |
| Nitrogen | 6.14 |

Found:

| | |
|---|---|
| Carbon | 47.57 |
| Hydrogen | 4.47 |
| Nitrogen | 6.21 |

Example XVII

This example illustrates the preparation of 2,5-bis-(chloroacetamidomethyl)-m-xylene. The catalyst was a cooled mixture of 22.5 milliliters of concentrated sulfuric acid and 52.5 milliliters of acetic acid (anhydrous). The reaction mixture comprised:

| | Grams |
|---|---|
| Paraformaldehyde | 18 |
| Meta-xylene | 26.5 |
| Chloroacetonitrile | 49 |

The paraformaldehyde was added to the cold catalyst mixture and the mixture of the meta-xylene and chloroacetonitrile was added dropwise at a temperature below about 75° C. After the exothermic reaction was spent, the temperature was raised to 90° C. As the mixture was heated it became viscous and opaque and after 3 hours, it partly solidified. The product was then poured into water and a granular suspension formed. The solid was then recrystallized 3 times from acetic acid to give the product having a melting point of 231° C.–233° C.

*Analysis.*—Calculated for $C_{14}H_{18}N_2O_2Cl_2$:

| | Percent |
|---|---|
| Carbon | 53.01 |
| Hydrogen | 5.72 |
| Nitrogen | 8.82 |
| Chlorine | 22.32 |

Found:

| | |
|---|---|
| Carbon | 53.21 |
| Hydrogen | 5.60 |
| Nitrogen | 8.83 |
| Chlorine | 22.21 |

Example XVIII

Example XVII was repeated except that beta-chloropropionitrile was substituted for the chloroacetonitrile. One hundred seventy-one (171) grams of 4,6-bis(chloropropioamidomethyl)-m-xylene (melting point 206° C.) was obtained. Analysis:

| | Calculated, Percent | Found, Percent |
|---|---|---|
| Nitrogen | 8.11 | 8.22 |

Example XIX 4,6-bis(aminomethyl)-m-xylene may be prepared in similar manner by hydrolysis of 4,6-bis(acetamidomethyl)-m-xylene with hydrochloric acid.

The reaction mixture comprised:

| | |
|---|---|
| 4,6-bis(acetamidomethyl)-m-xylene _____grams__ | 744 |
| Glacial acetic acid _____liter__ | 1 |
| Hydrochloric acid _____do____ | 1 |

The concentration of the hydrochloric acid was approximately 37 percent. The mixture was refluxed for 20 to 26 hours and was then cooled. The excess acids were removed by distillation under vacuum. As a result of the distillation, the material was converted into a thick, gummy mass of crystalline nature. The crystalline mass was chilled, slurried in petroleum hydrocarbon and filtered to provide a product melting in a range of 245° C. to 261° C.

The mass was treated with 1200 milliliters of a 25 percent sodium hydroxide solution in 1 liter of toluene to provide a solid phase and two liquid phases. The aqueous phase constituting one of said liquid phases was discarded. The solid phase was filtered, washed with toluene and then with aromatic petroleum naphtha and finally was recrystallized from methanol to provide 4,6-bis(aminomethyl)-m-xylene having a melting point in a range of 124° C.–129° C. This material, after two recrystallizations from methanol-benzene mixture, separated as long, colorless spikes having a melting point of 130° C.–131° C. This material had the formula:

$$C_{10}H_{10}N_2$$

The theoretical analysis of this compound is:

| | Percent |
|---|---|
| Carbon | 73.12 |
| Hydrogen | 9.82 |
| Nitrogen | 17.06 |

The experimentally determined value of this compound was:

| | Percent |
|---|---|
| Carbon | 72.92; 73.03 |
| Hydrogen | 9.69; 9.70 |
| Nitrogen | 17.10 |

The 4,6-bis(aminomethyl)-m-xylene may be reacted with various acids to form salts of the amine. In conducting the reaction to form one of said salts (sulfate), the reaction mixture comprised:

| | |
|---|---|
| 4,6-bis(acetamidomethyl)-m-xylene _____grams__ | 496 |
| Concentrated sulfuric acid _____milliliters__ | 250 |
| Water _____do____ | 2500 |

This mixture was refluxed with vigorous agitation for 3.5 hours and was then cooled and the cooled mixture incorporated with 500 milliliters of benzene. The mixture was filtered and the benzene layer and the filtered residue (35 grams) were discarded. The aqueous layer contained the salt of the amide. The latter was made alkaline with 450 grams of cold sodium hydroxide in 1 liter of water. The solution was further diluted with water to a total volume of 5 liters, after which it was extracted continuously with benzene for 5 hours and was then further extracted with butanol for 44 hours. The combined extracts were concentrated and the crystalline residue slurried with aromatic petroleum hydrocarbon solvent. The slurry was filtered and the product recrystallized from methanol to give 4,6-bis(aminomethyl)-m-xylene having a melting point of 129° C.–130° C.

The 4,6-bis(aminomethyl)-m-xylene prepared as described in the foregoing example may also be reacted with various acids to form salts. In conducting the reaction to form said salts the 4,6-bis(aminomethyl)-m-xylene and the acid are merely mixed together with heating, if necessary, to provide the desired salt. The following salts of this aninomethyl-m-xylene and their corresponding melting points as experimentally determined are as follows:

| | Melting points, ° C. |
|---|---|
| Dihydrochloride | 305–130 |
| Diacetate | 161–164 |
| Adipate | 195–197 |
| Azelate | 165–170 |
| Sebacate | 148–151 |

By application of the techniques of hydrolysis, as described in this example useful amines can readily be prepared from any of the amido compounds obtained in the other examples.

Similar amino products could also be obtained by hydrolysis of the corresponding amides with hot, aqueous alkali such as aqueous sodium hydroxide. It is preferred that the hydrolysis then be conducted in a closed container under pressure.

The foregoing amines can be reacted substantially mole for mole with dibasic acids such as sebacic acid, adipic acid, succinic acid, or the like to provide long chain, thermoplastic polyamide resins similar to the commercially available but being characterized, in most instances, by substantially higher melting points. In many cases such high melting points are quite desirable. The resulting polyamide resins, as hot melts, can be spun into fibers useful in forming fabrics, cordage or other filamentary bodies.

The diamines may also be employed in the hardening of epoxy resins, in which instance, they are employed as the amine hardening agent for the epoxy component, replacing diethyl amine or other amine conventionally employed in the reaction. The use of amines for hardening epoxy resins has been discussed in an article by Shechter, Wynstra, and Kurkjy, "Industrial and Engineering Chemistry," January 1956, pages 95 through 97. Following the techniques disclosed in the foregoing article, the amines as disclosed herein may be employed as hardening agents for the epoxy resins.

It has already been indicated that the amines, as obtained in the preceding examples, can successfully be formed into salts and then reacted with phosgene to form isocyanates. In those instances in which the compounds contain a plurality of amine groups as obtained by hydrolysis of the corresponding amides of Examples I through VII, it is possible to obtain compounds with a plurality of isocyanatomethyl groups adapting them for use with polyols in the preparation of polyurethane resins.

The following example illustrates the preparation of a diisocyanate from 4,6-bis(aminomethyl)-m-xylene prepared as already described.

*Example XX*

The aminomethyl compound was converted into the corresponding dihydrochloride by reaction with hydrochloric acid and the salt was then dispersed in tetralin (a non-reactive solvent). The reaction mixture comprised:

| | |
|---|---|
| 4,6-bis(aminomethyl)-m-xylene dihydrochloride _____grams__ | 59.3 |
| Tetralin _____milliliters__ | 500 |

The mixture was treated with a stream of chlorine-free phosgene at 200° C. to 205° C. until after a period of 5 to 7 hours when the evolution of hydrogen chloride was complete and none of the dihydrochloride salt remained suspended.

The dark solution was cooled, filtered through diatomaceous earth and the solvent contained therein distilled. The residue was finally distilled in vacuum to obtain 36 to 38 grams of a colorless, relatively odorless oil, constituting a yield of 69 percent to 70 percent by weight. This oil boiled at 171° C.–173° C. at 8 millimeters (absolute) of pressure and at 164° C.–165° C. at 3 millimeters (absolute) pressure. This oil reacted exothermically with alcohols such as methanol to form the corresponding dimethyl urethane melting at 173° C.–174° C.

It may also be reacted with polyhydric compounds or polyols such as caster oil or polyesters containing available hydroxyls and being represented by the polyesters of adipic acid and polyhydric alcohols such as diethylene glycol or glycerin or mixtures of the two. If polyurethane resins are thus to be formed, it is preferable to employ polyesters of a hydroxyl value of about 60 to 500 or 600. By substituting the diisocyanates as described for tolylene diisocyanate, it is possible to form plyurethane foams or polyurethane coatings in well known manner.

The forms of the invention as herein disclosed are to be considered by way of example. It will be apparent to those skilled in the art that numerous modifications may be made therein without departure from the spirit of the invention or the scope of the appended claims.

This application is a continuation-in-part of copending application, Serial No. 693,032, filed October 28, 1957, now abandoned.

I claim:

1. The method of preparing a compound of the structure

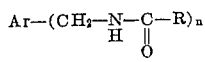

wherein Ar is a member of the class consisting of aromatic hydrocarbon radicals containing from 1 to 3 benzene nuclei, lower alkyl substituted aromatic hydrocarbon radicals containing from 1 to 3 benzene nuclei, lower alkoxy substituted aromatic hydrocarbon radicals containing from 1 to 3 benzene nuclei, and halogen substituted aromatic hydrocarbon radicals containing from 1 to 3 benzene nuclei, R is a member of the class consisting of hydrogen atoms and, alkyl, hydroxyalkyl, haloalkyl, carbalkoxyalkyl, aryl, aralkyl, and monoethylenically unsaturated hydrocarbon radicals containing up to about 18 carbon atoms, and $n$ is a whole number from 1 to 5, which comprises bringing together in the presence of a mineral acid catalyst and at a temperature in the range of about 0° C. to about 130° C., a member of the class consisting of aromatic hydrocarbons, lower alkyl substituted aromatic hydrocarbons, lower alkoxy substituted aromatic hydrocarbons, and halogen substituted aromatic hydrocarbons, each of said hydrocarbons containing from 1 to 3 benzene nuclei and having at least one available hydrogen atom on the aromatic nucleus, with a nitrile of the structure RCN, wherein R has the significance set forth hereinabove, and a member of the class consisting of formaldehyde and substances which decompose on heating to yield formaldehyde.

2. The method of claim 1 wherein a saturated aliphatic monocarboxylic acid is present in addition to the mineral acid catalyst.

3. The method of preparing 4,6-bis(acrylamidomethyl)-m-xylene which comprises bringing together m-xylene, acrylonitrile and paraformaldehyde in the presence of a mineral acid catalyst and at a temperature in the range of about 0° C. to about 130° C.

4. The method of claim 3 wherein the mineral acid catalyst is sulfuric acid.

5. The method of preparing 4,6-bis(acetamidomethyl) m-xylene which comprises bringing together p-xylene, acetonitrile, and paraformaldehyde in the presence of a mineral acid catalyst and at a temperature in a range of about 0° C. to about 130° C.

6. The method of claim 5 wherein the mineral acid catalyst is sulfuric acid.

7. The method of preparing bis(acetamidomethyl) naphthalene which comprises bringing together naphthalene, acetonitrile, and paraformaldehyde in the presence of a mineral acid catalyst and at a temperature in a range of about 0° C. to about 130° C.

8. The method of claim 7 wherein the mineral acid catalyst is sulfuric acid.

9. The method of preparing a mixture of acrylamidomethyl toluenes of the structure

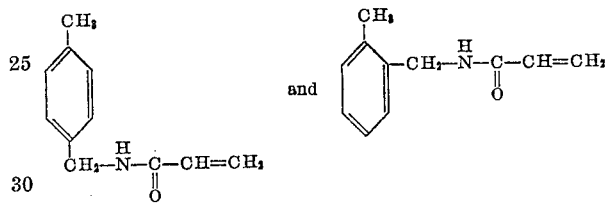

which comprises bringing together trioxymethylene, acrylonitrile, and toluene in the presence of a mineral acid catalyst and at a temperature in a range of about 0° C. to about 130° C.

10. The method of claim 9 wherein the mineral acid catalyst is sulfuric acid.

11. The method of preparing a mixture of ortho- and para-acetamidomethyl toluene which comprises bringing together toluene, acrylonitrile, and paraformaldehyde in the presence of a mineral acid catalyst and at a temperature in a range of about 0° C. to about 130° C.

12. The method of claim 11 wherein the mineral acid catalyst is sulfuric acid.

References Cited in the file of this patent

Hackh's Chemical Dictionary, 3rd ed., pages 74, 598, published by the Blakiston Co., Philadelphia (1944).

UNITED STATES PATENT OFFICE
CERTIFICATE OF CORRECTION

Patent No. 3,024,281                      March 6, 1962

Chester L. Parris

It is hereby certified that error appears in the above numbered patent requiring correction and that the said Letters Patent should read as corrected below.

Column 1, line 14, for "in situ" read -- *in situ* --; column 4, line 38, for "betreated" read -- be treated --; line 63, for "form" read -- foam --; column 11, line 39, for "in situ" read -- *in situ* --; column 13, lines 5 and 6, for "approximaterly" read -- approximately --; column 15, line 4, for "plyurethane" read -- polyurethane --.

Signed and sealed this 27th day of November 1962.

(SEAL)
Attest:

ESTON G. JOHNSON
ERNEST W. SWIDER
Attesting Officer

DAVID L. LADD
Commissioner of Patents